United States Patent [19]
Stein

[11] 3,803,682
[45] Apr. 16, 1974

[54] ROLLER FOR CONVEYOR SYSTEMS
[75] Inventor: Hans Vom Stein, Wermelskirchen, Germany
[73] Assignee: Hans Vom Stein oHG, Dhuenn/Rhld., Germany
[22] Filed: Jan. 10, 1973
[21] Appl. No.: 322,504

[30] Foreign Application Priority Data
Feb. 4, 1972  Germany............................ 2205243

[52] U.S. Cl............................................. 29/116 R
[51] Int. Cl............................................. B21b 13/02
[58] Field of Search.................... 29/116 R, 116 AD

[56] References Cited
UNITED STATES PATENTS
3,097,022  7/1963  Sernetz ............................. 29/116 R
3,334,523  8/1967  Rieser ............................. 29/116 R X
3,406,438  10/1968  Reilly ................................. 29/116 R
FOREIGN PATENTS OR APPLICATIONS
1,133,660  7/1962  Germany............................ 29/116 R Primary Examiner—Alfred R. Guest
Attorney, Agent, or Firm—Michael S. Striker

[57] ABSTRACT

A roller for conveyors has an elongated cylindrical sleeve. Antifriction roller bearings are mounted on a shaft passing through and coaxial with the sleeve at each end thereof. Holding means are provided which cooperate with the shaft and the inner race of the bearings for retaining the bearings from axially moving along the shaft. An intermediate annular tapered plastic ring engages the holding means with its radially inward surface and is provided on its radially outward surface with coaxial gear teeth. An outer annular tapered plastic ring has on its radially inward surface axial gear teeth engaged with those of the intermediate ring and is configurated to engage the sleeve and axially lock the intermediate ring when the rings are wedged between the sleeve and the holding means. On one end of the sleeve, the intermediate ring extends axially beyond the sleeve and is provided with sprocket wheels.

18 Claims, 4 Drawing Figures

ROLLER FOR CONVEYOR SYSTEMS

BACKGROUND OF THE INVENTION

The invention relates to a roller for conveyor systems, and more particularly to a roller of the type which is provided with anti-friction bearings at each end of the roller which are mounted on a shaft coaxial and passing through the roller and which engage with the latter by means of wedging means.

Rollers for conveyor systems are already known and take many forms. Many of these rollers are in the form of an elongated cylindrical sleeve and are provided with end members positioned at the end of the sleeves for supporting the same on a shaft which is coaxial and passes through the sleeve. There have been numerous proposals for connecting the end members to the sleeve. For example, the end members are known to be glued, welded, press fitted and the like to the sleeve. Several known roller constructions seek to improve the connection between the bearings and the sleeve by rolling or bending the end members over the sleeve about the edge or periphery thereof. The object, in insuring a good connection between the end members and the roller sleeve, is to fix the sleeve against axial sliding towards one side or the other, as well as against a relative angular rotation relative to the end members. However, the hitherto known connecting means between end members and the sleeve have, on the one hand, often been expensive to construct and, on the other hand, have not always provided satisfactory connections. Often, the original connection is not certain between the end members and the sleeve. Frequently, however, while the connection is satisfactory initially, this connection becomes unsatisfactory after the roller has been used for some time, due to the loosening of the originally fixed elements. Such loosening has often resulted from too great tolerances with which the individual elements are manufactured, which when the connecting means, e.g., glue, utilized to connect the sleeve to the end members fails, with result the end member will become disconnected from the sleeve. However, good fits of elements would require parts manufactured to very close tolerances, and this has not been possible at reasonable manufacturing cost.

When the sleeve and the end members are made from different materials, e.g., when the sleeve is made from metal and the end members are made from plastic, loosening frequently occurs between the two as a result of the different coefficient of expansion of the respective materials. Consequently, with temperature changes the sleeve and the end members contract and expand at different rates — this frequently causing failure of the connecting means for connecting the sleeve to the end members. Another frequent cause of failure, particularly with heavily loaded rollers, is the pressure which is applied to the sleeve, this pressure being transmitted from the sleeve to the end members and the connecting means are thus placed under very high stresses, with failure of the latter frequently resulting. Once the connecting means between the sleeves and the end members fails, relative rotation between the two occurs and this further tends to loosen the connection therebetween. Ultimately, the rollers become unusable for the purpose of which they were intended.

SUMMARY OF THE INVENTION

Accordingly, it is an object of the present invention to provide a roller for conveyors which avoids the disadvantages heretofore known in connection with similar rollers.

Another object of the invention is to provide a roller of the type under discussion which is simple in construction and economical to manufacture.

A still another object of the present invention is to provide a roller as described above which provides a reliable fixed relationship between the sleeve of the roller and the end members which support the same on a shaft.

A further object of the present invention is to provide a roller for conveyors which has a sleeve mounted on end members and the latter on a shaft, and which maintains the fixed connection between the sleeve and the end members during extended use.

It is a still further object of the present invention to provide a roller apparatus whose usefulness is not affected in time due to the loads which are applied thereto.

It is yet another object of the present invention to provide a roller of the type under discussion whose usefulness is not affected by extended temperature variations to which it is subjected.

Finally, it is an object of the present invention to provide a reliable roller for conveyors which does not require close tolerances between the sleeve and the end members, while still providing a long lifetime.

According to the present invention, a roller for conveyors comprises an elongated cylindrical sleeve having an inner surface. The sleeve has an axis, two opposite ends and a shaft is coaxial with and passes through the sleeve. Antifriction bearing means are arranged at each end of the sleeve and each bearing means has an inner race mounted on the shaft and an outer race. An annular wedging means is wedged between the outer race and the inner surface for connecting the bearing means to the respective ends of the sleeve.

According to a presently preferred embodiment, the wedging means comprises an outer annular ring and an intermediate annular ring. At least one of these rings being tapered in the axial direction away from the respective one of the ends. The rings are preferably made from a resilient material, preferably of plastic.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
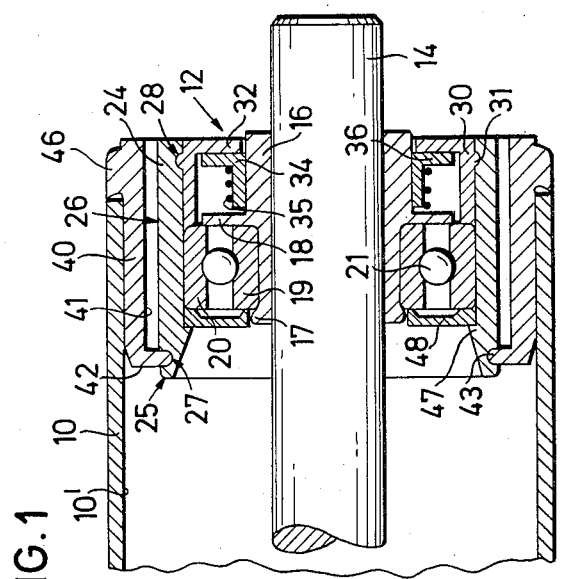
FIG. 1 is a fragmentary longitudinal cross-section of a roller in accordance with the present invention, showing the construction at the two ends of the roller.
Figure 1:
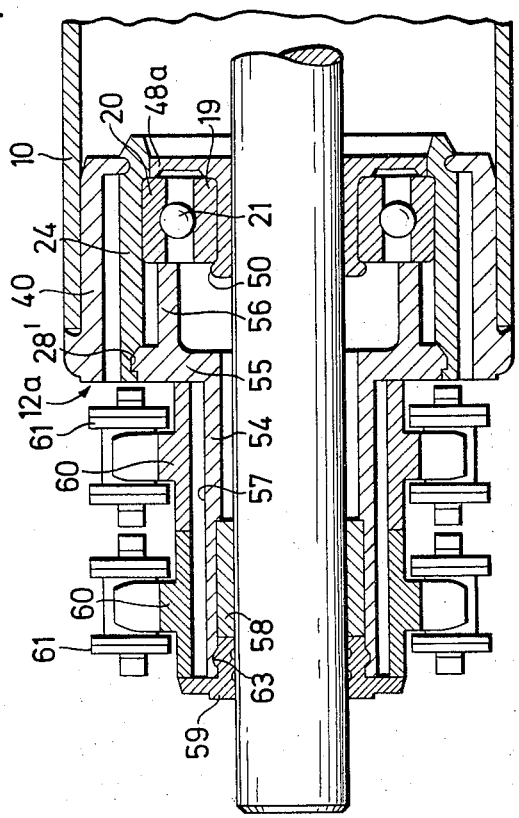

The roller according to a first embodiment, shown in FIG. 1, comprises an elongated and substantially cylindrical sleeve 10 having an inner surface 10'. The sleeve 10 can be made from metal, plastic or any other suitable material.

At the right end of the sleeve 10, as shown in FIG. 1, there is provided an end member generally designated by the reference numeral 12, while an end member generally designated by the reference numeral 12a is provided at the other end of the sleeve. It is over the members 12, 12a that the sleeve 10 is rotatably mounted on the shaft 14.

The end member 12 comprises a bushing 16 which is press-fitted on the shaft 14. For the purposes of the description which follows, the axial direction of the end member 12 towards the right, as viewed in FIG. 1, will be referred to as outwardly or towards the outside of the end member 12, while the directions towards the left, as viewed in FIG. 1, will be referred to as inwardly or towards the inside of the end member 12. On the inner side of the bushing 16 there is provided an annular projection or lip 17. Intermediate the inner and outer ends of the bushing 16, there is provided thereon a radially projecting flange 18. An antifriction bearing comprising races or race rings 19 and 20 and balls 21 is mounted on the bushing 16, with the inner race 19 axially fixed between the projection 17 and the flange 18. The bushing 16 is preferably made from a resilient material, e.g., plastic, and the antifriction bearing is positioned in the manner shown in FIG. 1 by forcing the inner race 19 over the annular projection 17, deforming the latter and urging the bearing over the projection until the bearing comes into contact with the flange 18. When the bearing comes into abutment against the flange 18, the annular projection 17 substantially returns to its undeformed state, and the inner race 19 becomes axially secured between these two radially extending projections.

The end member 12 is further provided with an intermediate annular ring 24 which at least partially engages the outer race ring 20. The inner end 25 of the intermediate ring 24 is configured to have a shoulder 47. A bearing holding ring 48 is provided at the inner axial side of the antifriction bearing and has a bearing surface which is adapted to be engaged by the shoulder 47, the purpose of the annular holding ring 48 being to prevent the entry of dust and dirt into the antifriction bearing. The intermediate ring is provided in the region of its outer end with an annular slot or groove 28. The groove 28 is configured to receive an annular projection 31 of a holding ring 30 of L-shaped cross-section when the roller is fully assembled, as described hereafter. Advantageously, either one of the intermediate ring 24 and the holding ring 30 is made of a resilient material, e.g., plastic, so that either the intermediate ring 30 or the annular projection 31 may be deformed prior to engagement of the projection with the groove 28. After assembly is completed and the annular projection 31 is aligned with the annular groove 28, the former extends into the latter and returns to its undeformed state to thereby fix the axial relationship between the intermediate ring 24 and the holding ring 30. The angular holding ring 30 is provided with a radially extending flange 32. The flange 32 and the flange 18 together form an annular space in which a sealing ring 34 is axially slidably mounted. A helical spring 35 is arranged about the angular sealing ring 34 so as to abut against the radially extending flange 36 thereof to thereby urge the sealing ring 34 against the flange 32 or towards the right, as viewed in FIG. 1. The annular space defined between the flanges 18 and 32 is advantageously filled with grease or other lubricant. Such an arrangement insures that during the rotation of the roller, a seal will be provided between the flanges 32 and 36 to thus seal the end member 12 from the exterior against moisture and other pollutants.

The intermediate ring 24 has an outer peripheral surface 26 which is provided with radial parallel projections in the form of gear teeth. The intermediate ring 24 is provided with an annular groove 27 in the region of its inner end 25.

The end member 12 is also provided with an outer ring 40 whose inner peripheral surface 41 is, similarly as the outer surface 26 of the intermediate ring 24, provided with parallel radial projections in the form of gear teeth, which teeth mesh with the gear teeth provided on the surface 26 of the intermediate ring 24. In this manner a relative angular movement about the shaft 14 between the rings 24 and 40 is prevented. The outer ring 40 is also provided with a bend or inwardly extending flange 42, whose annular edge defines a projection 43. The annular projection 43 is configured to engage the annular groove 27 provided in the intermediate ring 24 when the roller has been fully assembled, as to be described hereafter. In accordance with the presently preferred embodiment, the outer ring 40 is made from a resilient material, e.g., plastic, so that the inwardly extending flange 42 deforms prior to the engagement of the annular projection 43 with the annular groove 27. On the radially outwardly facing surface of the outer ring 40, the latter is provided with an annular flange 46 whose outer diameter is substantially equal to the outer diameter of the sleeve 10.

For the purposes of description, the intermediate ring 20 and the outer ring 40 are defined as together comprising wedging means which is to be wedged between the sleeve 10 and the antifriction bearing and its associated holding members. In accordance with the present invention, at least one of the rings 24, 40 is tapered towards the inside of the end member 12. However, it is also possible that both be tapered in this manner so that either one or both of these annular rings may serve or function as annular wedges. One practical example of such tapering which has been found satisfactory for this purpose is one wherein the tapering angle utilized is approximately 1.5° relative to the axis of the shaft 14.

The manner of assembling the roller will now be described. It should be kept in mind that the manner of assembly, while described for the end member 12, is equally applicable to the assembly of the left member 12a, with slight differences which will become apparent hereafter. Firstly, the friction bearing comprising the rings 19, 20 and rollers 21, the bearing holding ring 48, the angular sealing ring 34 with the helical spring 35 as well as the angular holding ring 30 are all mounted on the bushing 16 as illustrated in FIG. 1. The bushing 16 together with the enumerated elements mounted thereon are then inserted within the intermediate ring until respective engagement is obtained between the projection 17 and the lower race 19, the annular projection 31 and the annular groove 28, and the bearing surface of the holding ring 48 with the shoulder 47.

This assembly is then mounted securely on the shaft 14, e.g., by press fitting. At this time, the outer ring 40, subsequent to alignment of the respective axially parallel gear teeth on the rings 24, 40, is forced between the sleeves 10 and the intermediate ring 24, the tapered construction of at least one of the rings 24, 40 causing the end member 12 to be wedged in the sleeve 10. Being at least partially resilient, the annular rings 24, 40 at least partially deform during the wedging step and, because of the forces generated by the deformation of these rings, relatively high forces are applied to both the inner surface 10' of the sleeve 10, as well as to the intermediate ring 24 so that the end member is axially fixed on the shaft 14 due to the extremely high friction which must be overcome as a result of the wedging effect. Such construction permits effective wedging in an extremely simple manner and forms an important feature of the present invention. This construction can be reliably used over extended periods of time independently of load applied to the roller, as well as independently of the temperature changes to which it is subjected. When the outer ring 40 has been fully inwardly inserted to the position as shown in FIG. 1, the inwardly extending flange 42 which was at least partially deformed during the wedging step, is permitted to snap into the annular groove 27 to additionally insure that no axial relative movements take place between the annular rings 24 and 40.

The left end of the sleeve 10, as viewed in FIG. 1, is provided with an annular member 12a which is similar in construction to that of the described end member 12 and only deviates from this construction insofar as it is provided with means for engaging with links 61 of a sprocket chain. Identical or similar parts which are shown on the left side of the roller are designated by the same reference numerals as that used on the right side. The roller end member 12a is provided with an antifriction bearing sealing ring 48a which is in the shape of an angle ring. The sealing ring 48a is provided with an annular bushing 50 which is positioned intermediately between the inner race 19 and the shaft 14. The bushing 50 is provided at one end to an annular projection 50' which has a similar function as does the projection 17 and maintains the bearing on the bushing 50. An inner bushing 54 has a radially extending flange 55 from which projects an annular axial flange 56 coaxial with the shaft 14. The annular flange 56 acts as a spacer and is adapted to abut against the outer race 20 of the bearing — this further insuring that the antifriction bearing does not move axially to thereby leave the bushing 50. The annular flange 55 is provided at its outer radial periphery with a locking projection which is adapted to engage an annular groove 28' provided in a slightly modified intermediate ring 24'.

The bushing 54 comprises a portion which extends beyond the left end of the sleeve 10 and is provided with an outer peripheral surface 57 which is provided with parallal radial extending projections in the form of axial gear teeth. The gear teeth provided on the outer surface 57 are adapted to engage or mesh with gear teeth which are provided on the inner peripheral surfaces of sprocket wheels 16 to thereby insure that there is no relative angular movement about the shaft 14 between the bushing 54 and the sprocket wheels 60. A spacer sleeve 58 is mounted on the shaft 14 and positioned to abut against an angle ring 59 — the angle ring being provided with an annular projection which is engaged, in the assembled structure, in an annular slot or groove 63 provided in the bushing 54. The angle ring 59 has a radially extending flange which projects sufficiently to engage the sprocket wheels 60 so that by the locking engagement of the ring 59 with the bushing 54, an additional protection is provided against movement of the sprocket wheels 60 off the inner bushings 54. With the roller constructed as described above, it can be quickly assembled with minimum handling or manual operations and the wedging of the outer rings 40 in the regions of the ends of the sleeves 10 provides a rigid connection between the end members 12, 12a and the sleeve 10.

Figure 2:
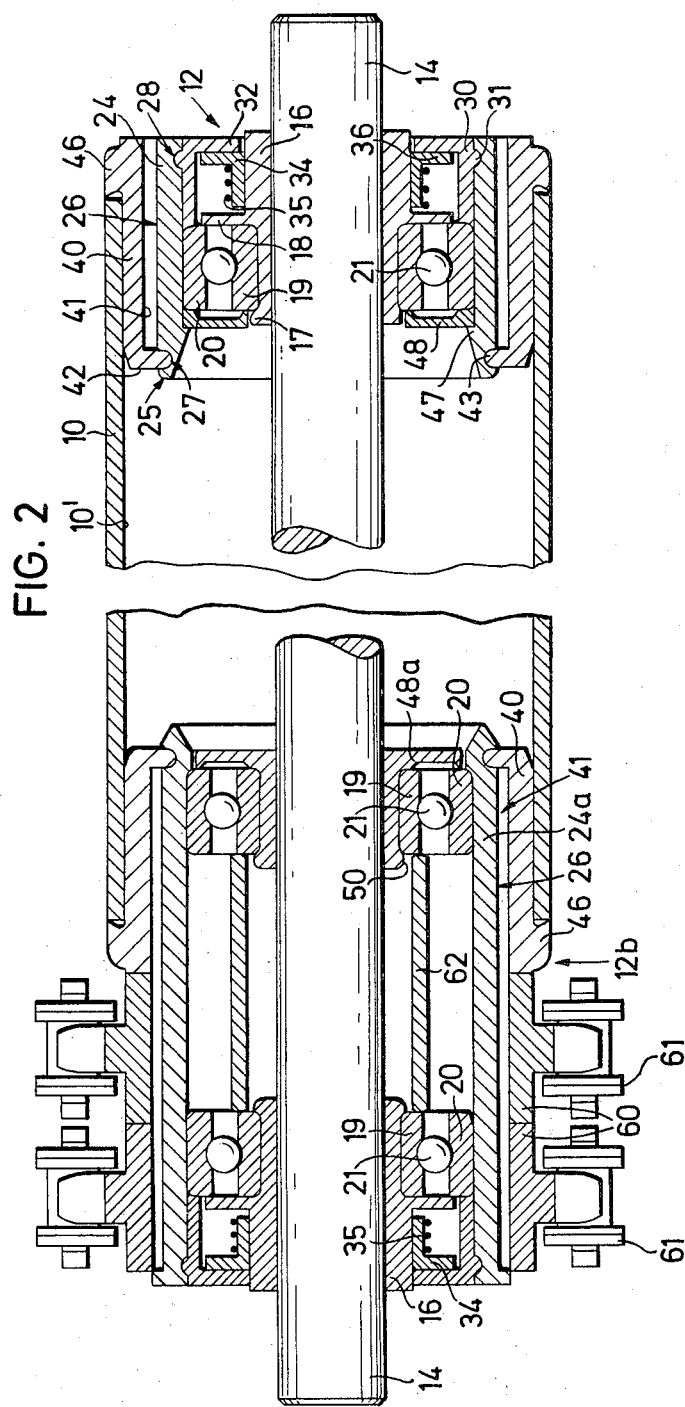
FIG. 2 is a fragmentary longitudinal cross-section of another embodiment of the roller shown in FIG. 1.

In FIG. 2, the left side of a second embodiment of the invention is illustrated. In this embodiment, the right-hand side of the roller is constructed in the same manner as in the first embodiment. The second embodiment differs from the first in that diameter of the sprocket wheels 60 is equal or greater than that of the sleeve 10. Thus, the end member 12b extends up to and beyond the outside diameter of the sleeve 10. The end member 12b is constructed essentially in the same way as the end members 12 and 12a, and similar or identical parts are designated by similar reference numerals and will not be again described.

The end member 12b is provided with two spaced antifriction bearings 19-21 with a spacer 62 therebetween and one abutting against an annular radially extending flange 18'. The intermediate ring 24a is extended in the axial direction beyond the end of the sleeve 10 and exhibits, as does the intermediate ring 24, axial projections in the form of gear teeth along its exterior surface. These gear teeth mesh directly with the gear teeth provided on the inner surface of the sprocket wheels 60. The bushing 16' is, to the left of the flange 18', similar in construction to that of bushing 16 and the sealing means described in connection with the end member 12 is provided to the left of the flange 18'.

Figure 3:
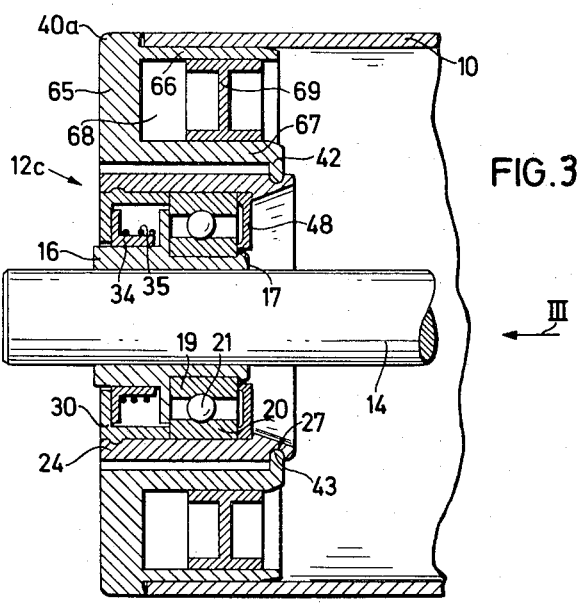
FIG. 3 is a fragmentary longitudinal cross-section of one end of a roller in accordance with a third embodiment of the present invention.
Figure 4:
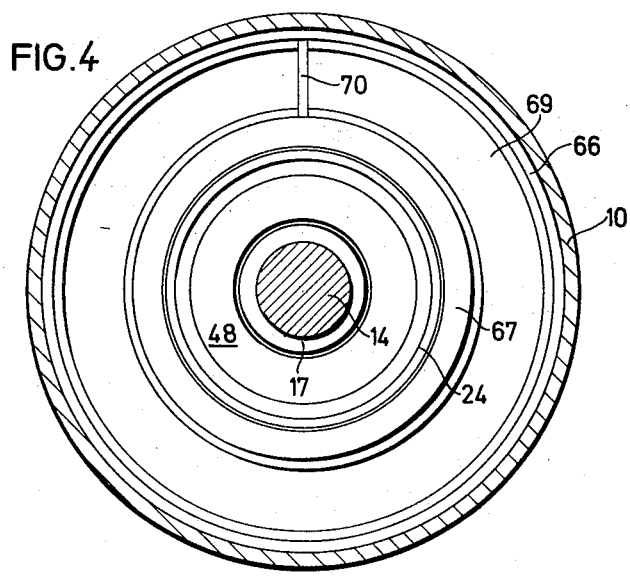
FIG. 4 is a transverse cross-section of the roller shown in FIG. 3, when viewed in the direction indicated by the arrow III.

FIGS. 3 and 4 illustrate a still further embodiment which is particularly suitable for rollers having large outside diameters. The end member, here designated by reference numeral 12c, is essentially similar in construction to that which has been described in connection with the end member 12 according to FIG. 1 and similar or identical parts have again been designated by the same reference numerals and will not be again described here.

If the sleeve 10 must of necessity have a large diameter, the outer ring 40a can, in accordance with the embodiments illustrated in FIGS. 3 and 4, have a cross-section in the shape of a U. The outer ring 40a has a radially extending annular flange 65, a portion of which abuts the sleeve 10, and two axially directed annular flanges, i.e., an outer flange 66 and an inner flange 67 which are radially spaced from one another. The outer flange 66 is arranged to frictionally engage the inner surface of the sleeve 10, while the inner flange 67 serves the same function as that which has been described in connection with the outer ring 40 of the end member 12. The space 68 which is formed between the flanges 66, 67 opens axially inwardly. A filling member 69 is provided in the space 68 to maintain the separation between the flanges 66, 67. The filling member 69 has, for example, the form of a H-cross section and is positioned in the space 68 prior to the outer ring being wedged between the sleeve 10 and the intermediate ring 24. By wedging in the outer ring 40a and the sleeve 10, the required elasticity may be achieved by providing a slot the annular filling member 69 —as designated by the reference numeral 70 in FIG. 4.

With this construction, rollers for conveyor systems can be constructed having very large outer diameters. Essentially, the outer ring 40a serves not only as a wedging element but as a radial spacer. By utilizing suitably dimensioned filling members 69, almost any outside diameter may be attained. Also, it should be pointed out that the filling member as described is only exemplary and is not limited to the construction described. The filling member 69 may take on any other cross-section, any other form, and may, for example, be made from metal segments or bars or the like.

It will be understood that each of the elements described above, or two or more together, may also find a useful application in other types of rollers differing from the types described above.

While the invention has been illustrated and described as embodied in rollers for conveyor systems constructed by the use of wedging members, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

1. Roller for conveyors, comprising an elongated cylindrical sleeve having an inner surface, an axis and two opposite ends; a shaft coaxial with and passing through said sleeve; antifriction bearing means arranged at each end of said sleeve and each having an inner race mounted on said shaft and an outer race; and annular wedging means wedged between said outer race and said inner surface for connecting said bearing means to the respective ends of said sleeve, said wedging means comprising an outer ring and an intermediate ring, at least one of said rings being tapered in the axial direction away from a respective one of said ends.

2. Roller as defined as in claim 1, wherein at least one of said rings is made from a resilient material.

3. Roller as defined in claim 1, wherein both rings are tapered in the axial direction away from a respective one of said ends.

4. Roller as defined as in claim 1, wherein at least one of said rings is made from a resilient material.

5. Roller as defined as in claim 4, wherein said one ring is made from plastic.

6. Roller as defined as in claim 1, wherein each ring has an annular surface facing the other ring in the wedged positions of said rings, and wherein one of said rings has an annular projection on its surface, and wherein the other of said rings has an annular locking groove arranged to engage with said annular projection in the wedged positions of said rings, whereby said rings are locked to each other and prevented from moving axially relative to one another.

7. Roller as defined as in claim 1, wherein each ring has an annular surface facing the other ring in the wedged positions of said rings, and wherein each ring is further provided with elongated axial projections along said respective surfaces, said projections from each ring being arranged to engage the projections from the other ring, whereby said rings are locked to each other and prevented from moving angularly about said axis relative to one another.

8. Roller as defined as in claim 7, wherein said projections comprise gear teeth.

9. Roller as defined as in claim 1, wherein said intermediate ring has a portion extending axially beyond a respective end of said sleeve in the wedged position of said rings; and further comprising a sprocket wheel mounted on said portion.

10. Roller as defined as in claim 9, wherein said portion is provided with radially outwardly extending axial gear teeth, and wherein said sprocket wheel is provided with radially inwardly extending gear teeth, said gear teeth being arranged to mesh with each other to lock said portion and said sprocket wheel against relative angular movements.

11. Roller as defined as in claim 1, wherein said outer ring has U-channel cross-section having inner and outer annular flanges spaced radially from one another and being open in the axial direction; and further comprising filler means arranged between said inner and outer flanges to maintain the radial spacing therebetween.

12. Roller as defined as in claim 11, wherein said filler means comprises an annular profiled bar.

13. Roller as defined as in claim 12, wherein said bar is slotted.

14. Roller as defined as in claim 12, wherein said bar has an H-shaped cross section.

15. A roller as defined in claim 1, further comprising first and second holding rings disposed axially to each side of each of said bearing means and arranged to abut against respective axial sides of said bearing means, and wherein said intermediate ring cooperates with said holding rings for preventing the latter from axial movement relative to said intermediate ring.

16. A roller as defined in claim 15, wherein said first holding ring is provided with a bearing surface and wherein said second holding ring is provided with a radially outwardly annular projection, and wherein said intermediate ring is provided with a shoulder and an annular slot arranged to respectively engage said bearing surface and said annular projection in the wedged position of said intermediate ring.

17. A roller as defined in claim 16, further comprising a bushing mounted on said shaft and extending axially between said two holding rings, said bushing having a radially extending flange intermediate said two holding rings and arranged for at least partial abutment against said bearing means, and having, in the region of first holding ring a radially outwardly annular projection for at least partially abutting against said inner race.

18. A roller as defined in claim 17, wherein said second holding ring and said intermediate flange form an annular space, and further comprising an annular sealing ring arranged for axial movement in said annular space; and biassing means for urging said sealing ring to a sealing position.

* * * * *